United States Patent [19]

Kakutani

[11] Patent Number: 5,748,336
[45] Date of Patent: May 5, 1998

[54] IMAGE PROCESSING METHOD AND IMAGE PROCESSING APPARATUS

[75] Inventor: Toshiaki Kakutani, Nagano, Japan

[73] Assignee: Seiko Epson Corporation, Tokyo, Japan

[21] Appl. No.: 726,689

[22] Filed: Oct. 7, 1996

[30] Foreign Application Priority Data

Oct. 6, 1995 [JP] Japan ................................. 7-260582
Jun. 21, 1996 [JP] Japan ................................. 8-161282

[51] Int. Cl.$^6$ ........................... H04N 1/40; G06K 9/36; G06K 9/38; G06K 9/46
[52] U.S. Cl. .................. 358/458; 358/447; 358/456; 358/521; 382/237; 382/252
[58] Field of Search ................... 358/261.2, 432, 358/429, 426, 433, 447, 448, 455, 456, 458, 466, 521, 534; 382/251, 252, 237, 254

[56] References Cited

U.S. PATENT DOCUMENTS

| | | | |
|---|---|---|---|
| 5,060,284 | 10/1991 | Klees | 382/53 |
| 5,079,624 | 1/1992 | Sasuga et al. | 358/515 |
| 5,168,373 | 12/1992 | Nakamura | 358/406 |
| 5,226,096 | 7/1993 | Fan | 382/50 |
| 5,321,525 | 6/1994 | Hains | 358/456 |
| 5,488,673 | 1/1996 | Katayama et al. | 382/270 |
| 5,515,180 | 5/1996 | Maeda et al. | 358/458 |
| 5,523,861 | 6/1996 | Tanaka et al. | 358/475 |

FOREIGN PATENT DOCUMENTS 7-111591  4/1995  Japan ........................ H04N 1/405

*Primary Examiner*—Edward L. Coles, Sr.
*Assistant Examiner*—Madeleine A.V. Nguyen
*Attorney, Agent, or Firm*—Sughrue, Mion, Zinn, Macpeak & Seas, PLLC

[57] ABSTRACT

An image processing method for converting multi-gradation image data into two-gradation image data by employing an error diffusion method, the image processing method comprises the steps of: (1) adding a diffusion error derived from at least one pixel which has already been binary-coded and is located near a pixel of interest to multi-gradation image data of this pixel of interest to thereby obtain corrected data; (2) comparing the corrected data with a threshold value and converting the corrected data into two-gradation image data for indicating any one of a dot ON and a dot OFF; (3) calculating a quantizing error corresponding to a difference between the corrected data and a first evaluation value corresponding to the two-gradation image data; (4) diffusing the quantizing error to a plurality of pixels which have not yet been binary-coded and are located near the pixel of interest; and (5) varying the first evaluation value corresponding to the two-gradation image data indicative of the dot ON in accordance with the multi-gradation image data of the pixel of interest.

15 Claims, 9 Drawing Sheets

*: PIXEL OF INTEREST

FIG. 10

*: PIXEL OF INTEREST

IMAGE PROCESSING METHOD AND IMAGE PROCESSING APPARATUS

BACKGROUND OF THE INVENTION

The present invention relates to an image processing method and an image processing apparatus for converting multi-gradation image data into two-gradation image data representative of a half tone. More specifically, the present invention is directed to an image processing method and an image processing apparatus for converting the multi-gradation image data into the two-gradation image data by employing an error diffusion method.

Conventionally, multi-gradation image data read by employing an image input apparatus such as a scanner, and multi-gradation graphic image data calculated by employing a computer are reproduced to be displayed by utilizing an image output apparatus such as, for instance, a CRT display, a liquid crystal display, and a printer. Otherwise, these multi-gradation image data and multi-gradation graphic image data are reproduced to be displayed by employing an image output apparatus such as a facsimile and a digital copying machine.

In this case, there is no problem when such an apparatus capable of reproducing/displaying the multi-gradation image data is employed as the image output apparatus. In such a case that a printer and a display device are employed in which the gradation cannot be controlled with respect to each of dots, the binary coding process (also referred to as "half toning") for reducing the gradation numbers of the respective pixels to the two gradations must be carried out. Furthermore, when the multi-gradation image data is stored, or transferred, the binary coding process is similarly, widely carried out in order to reduce the data amount thereof.

Conventionally, as one of the binary coding processes, the error diffusion method and the mean diffusion method functioning as a modification of this error diffusion method are widely utilized (will be referred to as an "error diffusion method" containing the typical error diffusion method and the typical mean error diffusion method). In accordance with the error diffusion method, quantizing errors produced by binary-coding the respective pixels are diffused and then added to pixels which have not yet binary-coded and are located around the first-mentioned pixels (otherwise, these pixel values are corrected based on quantizing errors). For instance, in the case that inputted original image data is 256-gradation data having a range from a gradation value of "0" to a gradation value of "255", an input gradation value is compared with a predetermined threshold value, e.g., "127". If the input gradation value is smaller than this threshold value, then a binary gradation value "0" (namely "dot OFF", i.e., "empty") is outputted, whereas if the input gradation value is larger than this threshold value, then another binary gradation value "255" (namely, "dot ON") is outputted.

It should be understood in this specification that although an expression "gradation value" is used under such a relationship that a minimum gradation value (for instance, "0") corresponds to a dot OFF and a maximum gradation value (for example, "255") corresponds to a dot ON for the sake of convenience, the descriptions of this specification may be apparently applied thereto under a reverse relationship with respect to the above-described relationship. In actual, a "gradation value" corresponds to, for instance, values of brightness and lightness in a CRT, and an amount of ink in an ink jet printer. The expression "dot ON" implies that for instance, ink droplets are jetted on a white paper in an ink jet printer, write light is illuminated on a photosensitive drum in an electro-photographic printer, a thermographic paper is heated in a thermal printer, and an electron beam is projected onto a fluorescent screen of a CRT. Another expression "dot OFF" implies that the above-described operations are not carried out.

On the other hand, in an actual printer, there are great different contribution rates with respect to gradation of 1 dot between a high-density image region whose dot density is high, and a low-density image region whose dot density is low. In normal printers, a dot diameter of 1 dot is set to be rather larger than a pixel interval in order to increase allowable degrees with respect to paper transport precision, and therefore the resultant dot diameter is made more than two times of the pixel interval. Accordingly, the respective dots overflow peripheral pixels. In a high-density region, as to 1 dot existing and surrounded by pixels of dot ON, an overflow portion of this 1 dot is canceled by the peripheral dots. However, as to 1 dot solo existing in a low-density region, this 1 dot overflows pixels of dot OFF (empty) around this 1 dot, so that a gradation value of this low-density region is increased from an ideal value. Assuming now that a diameter of a dot is K times larger than a pixel interval, an ink area by 1 dot becomes πK×K/4 of a pixel area. For example, in the case of K=2, the ink area by 1 dot becomes more than three times of the pixel area. As a consequence, in such a low-density region whose dot density is equal to, for example, 1/255, the gradation value of the printed image would become greatly larger than that of the original image. In other words, a relationship between an input gradation value (dot density) and an output gradation value (light absorption rate) no longer represents linearity, and thus such a very steep gradient appears in a low-density region as shown in a curve "f(Data)" of FIG. 1.

Figure 1:
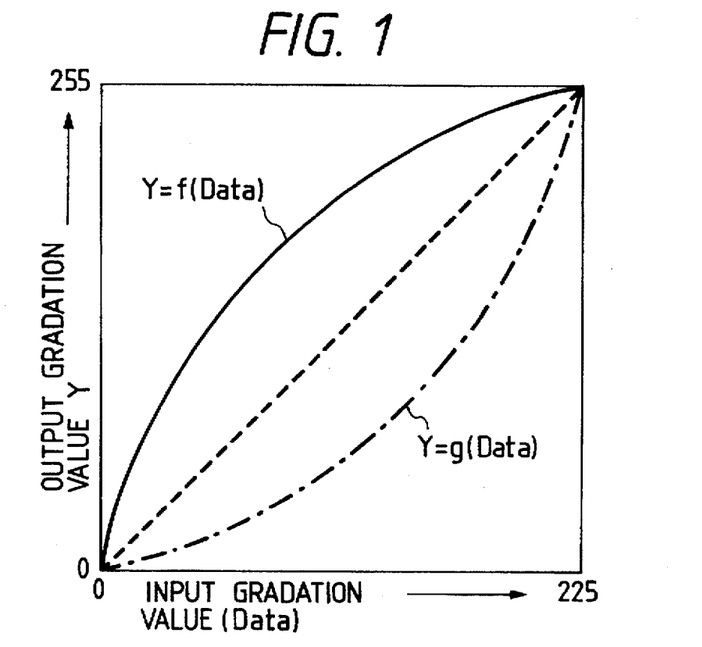
FIG. 1 is a graph showing an example of a gamma characteristic specific to an image printing system.

To solve this problem, conventionally, a so-called "gamma correction" is carried out namely the correction for the reverse characteristic to the curve f (Data) of FIG. 1, before the original image data is binary-coded. Concretely speaking such a conversion is carried out as shown in the following Table 1:

TABLE 1

| G0 | 0,1,2 | 3,4,5, | 6,7,8 | ... | 253 | 254 | 255 |
|---|---|---|---|---|---|---|---|
| Gγ | 0 | 1 | 2 | ... | 246 | 250 | 255 |

In this table, symbol "G0" indicates a gradation value of an input image, and symbol "Gγ" denotes a gradation value after the gamma correction has been made.

However, there is such a problem that the gradation number of the original image cannot be effectively utilized. As apparent from the Table 1, in the low density region, a plurality of input gradation values (for instance, "0", "1", "2") are particularly compressed to one of the output gradation values (for example "0"), so that the original information would be lost. As a result, a detailed image portion would be damaged, or a quasi-contour would be produced in the printed out image.

SUMMARY OF THE INVENTION

An object of the present invention is such that a two-gradation image having a smooth gradation characteristic can be produced without any damage of a detailed image portion and any quasi-contour in a low density region by improving the error diffusion method.

Another object of the present invention is such that a process operation of the improved error diffusion method can be realized at high speed by employing a very simple arrangement.

Generally speaking, in accordance with the error diffusion method, the below-mentioned process operations are carried out as follows: That is, the processing steps includes:

(1) adding a diffusion error derived from at least one pixel which has already been binary-coded and is located near a pixel of interest to multi-gradation image data of this pixel of interest to thereby obtain corrected data;

(2) comparing the corrected data with a threshold value and converting this compared data into two-gradation image data for indicating any one of a dot ON and a dot OFF;

(3) calculating a quantizing error corresponding to a difference between the corrected data and an evaluation value corresponding to this two-gradation image data; and (4) diffusing the quantizing error to a plurality of pixels which have not yet been binary-coded and are located near the pixel of interest.

In an image processing method and an image processing apparatus according to the present invention, when this error diffusion method is executed, the evaluation value corresponding to the dot ON among the evaluation values employed so as to calculate the quantizing error at the above-mentioned step (3) is varied in response to a value of the multi-gradation image data of the pixel of interest.

For instance, when the inputted multi-gradation image data corresponds to 256-gradation data having a range from a gradation value of "0" to a gradation value of "255", the quantizing error "Error" is calculated by the conventional error diffusion method as follows: When the binary-coded result is the dot ON, Error=Data_corrected−255. And, when the binary-coded result is the dot OFF, Error=Data_corrected. In this calculation, symbol "Data_corrected" is the above-described correction data. In other words, in the conventional error diffusion method, even when the evaluation value corresponds to the dot ON is equal to "255", and the evaluation value corresponds to the dot OFF, the quantizing errors are constant values in any cases.

To the contrary, according to the present invention, the evaluation value corresponding to the dot ON is varied in accordance with the value of the multi-gradation image data. In other words, when the binary-coded result is the dot ON, the quantizing error "Error" is calculated by:

Error=Data_corrected−on_value(Data), and the evaluation value "on_value(Data)" is varied in response to the value "Data" of the multi-gradation image data. For instance, when the value "Data" of the multi-gradation image data is equal to "255", the evaluation value "on_value(Data)" becomes "255", whereas the smaller the multi-gradation data value "Data" becomes, namely the lower the density becomes, the larger the evaluation value "on_value(Data)" becomes. Otherwise, when the multi-gradation data value "Data" is equal to the medium density value, or the high density value, the evaluation value "on_value(Data)" is equal to "255" or a value approximated to "255". To the contrary, when the multi-gradation image data value "Data" is equal to the value of low density (namely, value close to "0"), the evaluation value "on_value(Data)" becomes such a value larger than "255".

Figure 2:
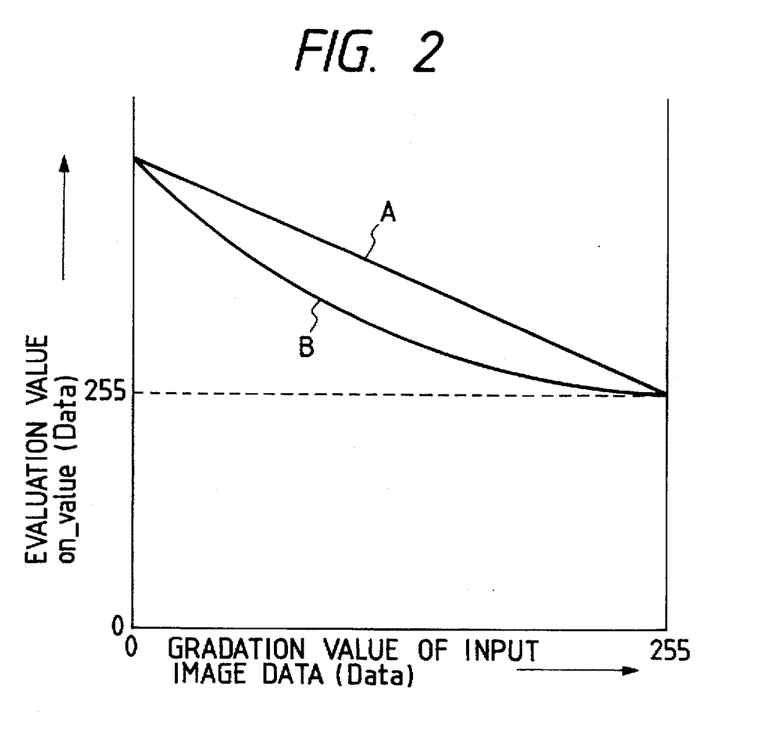
FIG. 2 is a graph showing a concrete example how to vary an evaluation value used in an error calculation step in a binary-coding process by using the error diffusion method.

The evaluation value "on_value(Data)" may be changed in a linear manner with respect to the multi-gradation data value, as illustrated in a straight line "A" of FIG. 2, otherwise may be changed in a serve manner with respect to the multi-gradation data value, as represented in a curve "B" of FIG. 2. For instance, when the straight line "A" is expressed by a formula, it is given as:

on_value(Data)=255+(a−1)×(255−Data), whereas when the curve B is expressed by a formula, it is given as:

on_value(Data)=255+(a−1)×(255−Data)(255−Data)/255.

In this formula, symbol "a" denotes a properly determined real number larger than, or equal to 1, and implies such an evaluation that the contribution rate for the gradation of the dot in the low density region is "a" times larger than that of the dot in the high density region. In accordance with the above-described formulae, the evaluation value during the dot ON in the low density region where the multi-gradation data value is nearly equal to "0" is "a" times larger than the evaluation value during the dot ON in the maximum density region where the multi-gradation data value is equal to "255".

Furthermore, evaluation value "on-value(Data)" during the dot ON may be varied in close-correspondence with the gamma characteristic owned by an image forming apparatus (for example, a printer and a display) under no application condition of the present invention. As previously described, the gamma characteristic is such an input/output characteristic as represented by the curve "f(Data)" in FIG. 1. Conventionally, in order to correct this gamma characteristic, the gradation value conversion is executed in accordance with the curve "g(Data)" equal to the inverse function of this curve "f(Data)" before the binary-coding process operation is carried out.

Figure 3:
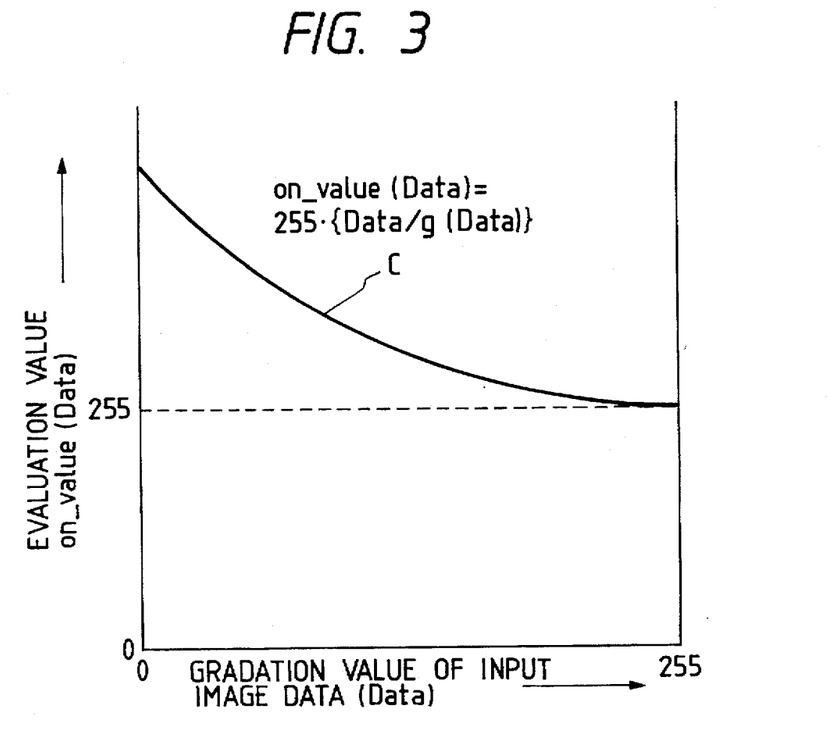
FIG. 3 is a graph showing another concrete example how to vary an evaluation value used in an error calculation step in a binary-coding process by using the error diffusion method.

To the contrary, according to the present invention, the evaluation value "on_value(Data)" during the dot ON is changed in such a manner, for example, $$\text{on\_value(Data)}=A\times\{\text{Data}/g(\text{Data})\} \qquad (1)$$

wherein the formula depends on the curve "g(Data)". In this formula, symbol "A" indicates a maximum density value allowed to the multi-gradation data. For example, in 256-gradation data, A=255. This formula (1) is expressed by a curve C of FIG. 3.

Since the same correction result is obtained when the gamma correction is carried out by changing the evaluation value "on_value(Data)" in accordance with the formula (1), the process operation of the gamma correction can be omitted. The evaluation value is changed, so that the gamma correction process can be omitted. Accordingly, it could be expected that the arrangement of the apparatus may be made simple and also the process speed may be increased.

The above description also implies that equivalent gradation correction effects is achieved by multiplying the gradation data value by "X" by way of the gamma correction, and by multiplying the evaluation value "on_value(Data)" without the gamma correction. In addition thereto, as previously explained, the information in the low density region is lost during the gamma correction, but such an information loss is not lost, depending on the variation of the evaluation value. That is, in the case of the gamma correction, as represented in the table 1, an information drop will occur such that any of the gradation values "0", "1", "2" are converted into the gradation value "0". On the other hand, when the evaluation value "on_value(Data)" is multiplied by, for instance, three instead of the gamma correction, it is possible to achieve the same effects as those achieved when the gradation value "1" is gamma-converted into another gradation value "0.33", and the gradation value "2" is gamma-converted into another gradation value "0.67". In other words, it is possible to achieve such an equivalent effect to the effect achieved when the conversion is carried out not by the discrete quantizing value, but by the continuous real value.

In the above explanation, the evaluation value "on_value (Data)" when "Data" is equal to 255 is selected to be a value approximated to "255". Alternatively, in such case that sufficient density can be achieved even when the pixel of 100% is not set to ON, the evaluation value "on_value (Data)" when "Data" is 255 may be selected to be a value greatly larger than "255". In this case, even when "Data" is 255, all of the pixels may not become ON.

Preferably, according to the present invention, the threshold value used in the above-described step (2) of the error diffusion method may be changed in response to the multi-gradation image data value "Data" of the pixel of interest. For instance, when a threshold value is expressed by "thrld", an evaluation value during the dot ON is expressed by "on_value (Data)", and an evaluation value during the dot OFF is expressed by "off_value (Data)".

The threshold value "thrld" is preferably varied in order to satisfy at least one of the following two conditions (a) and (b), namely:

(a) when "Data" is a gradation value of low density, Data≦thrld≦(m+Data)/2;

(b) when "Data" is a gradation value of high density, (m+Data)/2≦thrld≦Data, where:

$$m=(\text{off\_value(Data)}+\text{on\_value(Data)})/2.$$

As a consequence, the image quality deterioration phenomenon specific to the error diffusion method, called as "delay of dot occurrence" or "tailing phenomenon" can be solved.

DETAILED DESCRIPTION OF THE PREFERRED EMBODIMENTS

Figure 4:
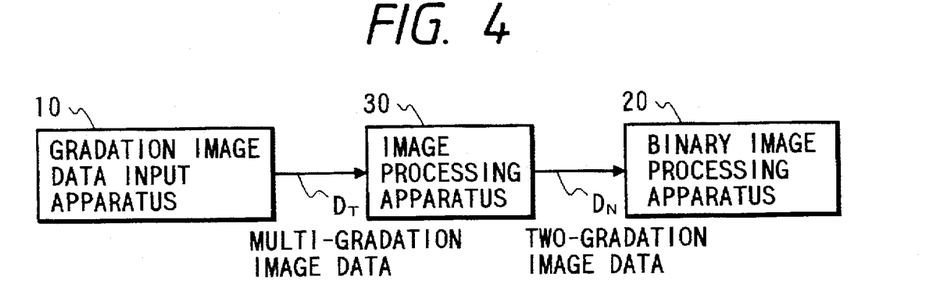
FIG. 4 is a block diagram for indicating an image forming system with employment of an image processing method according to an embodiment of the present invention.

FIG. 4 represents an image forming system with employment of an image processing method according to the present invention. In this system, multi-gradation data DT of an original image outputted from a gradation image data output apparatus 10 is inputted to an image processing apparatus 30. The image processing apparatus 30 converts the entered multi-gradation data DT into two-gradation data ON capable of expressing a half tone by using the error diffusion method, and then outputs the converted data to a binary image output apparatus 20. In response to the two-gradation data DN, this binary image output apparatus 20 outputs a binary image constructed by combining a dot ON with a dot OFF, which are obtained by quasi-reproducing the original image.

The gradation image data output apparatus 10 corresponds to, for example, a computer. This computer can output the multi-gradation image data DT stored in a storage device such as a hard disk and a CD-ROM toward the image processing apparatus 30. The multi-gradation image data DT corresponds to 256-gradation data having a range defined from a gradation value of "0" to a gradation value of "255". This computer can also output multi-gradation image data DT of computer graphic. Other than this computer, a scanner and a video camera may be utilized as the gradation image data output apparatus 10.

The binary image output apparatus 20 is such a type of printer as an ink jet printer in which no gradation control is carried out with respect to each of dots. Other than this printer, a CRT display, a liquid crystal display, a facsimile apparatus, and a digital copying machine may be employed as the binary image output apparatus 20.

Figure 5:
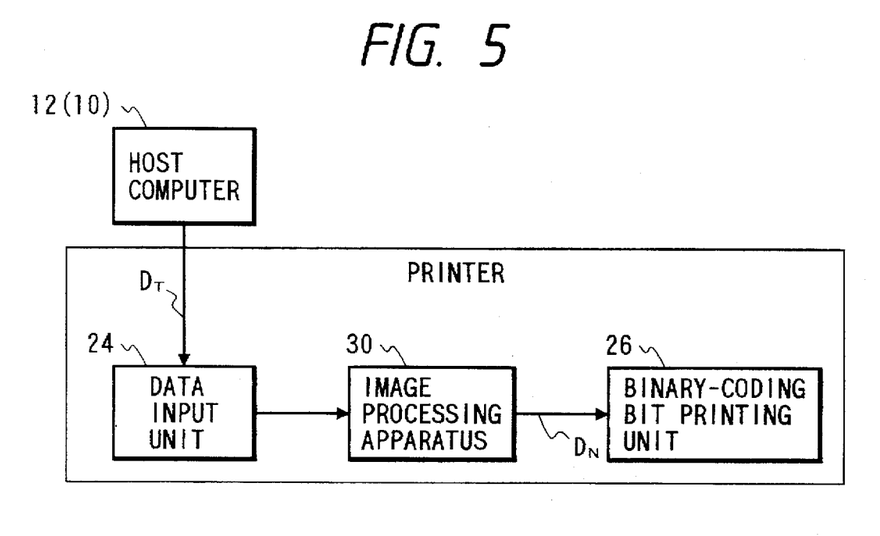
FIG. 5 is a schematic diagram for showing one example of an overall image processing system combined with the image processing apparatus according to the present invention.

The image processing apparatus 30 may be separated from either the gradation image data output apparatus 10 or the binary image output apparatus 20, and otherwise may be assembled into the image data output apparatus 10 or the image output apparatus 20. In one example of the image forming system, as illustrated in FIG. 5, a host computer 12 is used as the gradation image data output apparatus 10, and a printer 22 is employed as the binary image output apparatus 20. Then, the image processing apparatus 30 is built in the printer 22 in the form of software, hardware, or combination thereof. The printer 22 includes a data input unit 24 for receiving the multi-gradation image data DT derived from the host computer 12, the image processing apparatus 30, and a binary-coding dot printing unit (namely, print engine) 26.

Figure 6:
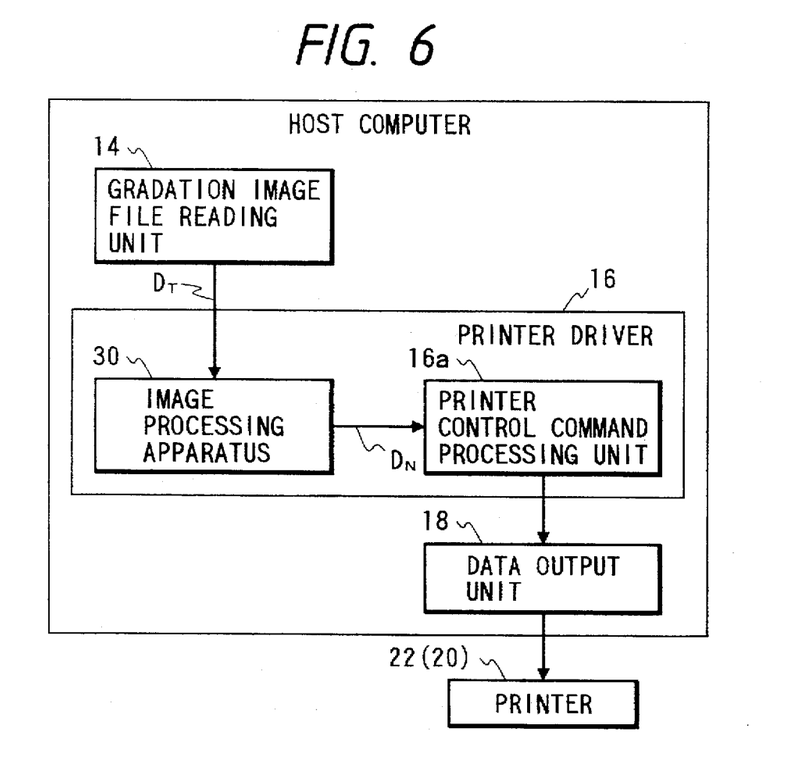
FIG. 6 is a schematic diagram for showing another example of an overall image processing system combined with the image processing apparatus according to the present invention.

As shown in FIG. 6, in another example of the image forming system, the image processing apparatus 30 is assembled into the host computer 12. The host computer 12 has a multi-gradation image file reading unit 14, a printer driver 16, and a data output unit 18. The printer driver 16 includes an image processing apparatus 30 for receiving the multi-gradation data DT derived from the reading unit 14, and also a printer control command producing unit 16a for producing a printer control command in response to the output from this image processing apparatus 30. The printer 22 is operated in response to the printer control command outputted from the printer control command producing unit 16a.

Figure 7:
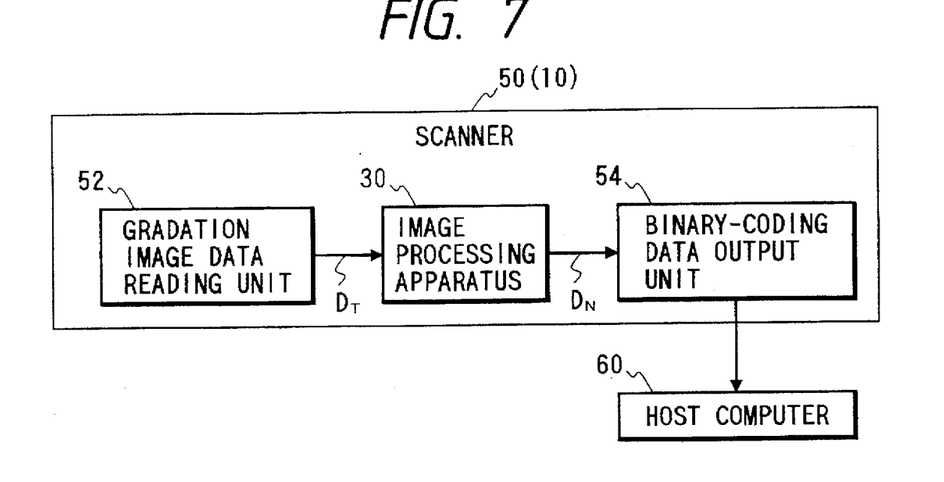
FIG. 7 is a schematic diagram for showing a further example of an overall image processing system combined with the image processing apparatus according to the present invention.

In a further example of the image forming system, as shown in FIG. 7, a scanner 50 is employed as the gradation image data output apparatus 10. The scanner 50 is constituted by a gradation image data reading unit 52 for optically reading an image, the image processing apparatus 30 for converting the read multi-gradation data DT into the two-gradation data DN, and a binary-coding data output unit 54 for outputting the two-gradation data DN to the host computer.

It should be noted that the image processing apparatus 30 of the present invention may also be assembled into any apparatuses other than the above-explained apparatus.

A detailed description will now be made of the image processing apparatus 30 according to the present invention.

Figure 8:
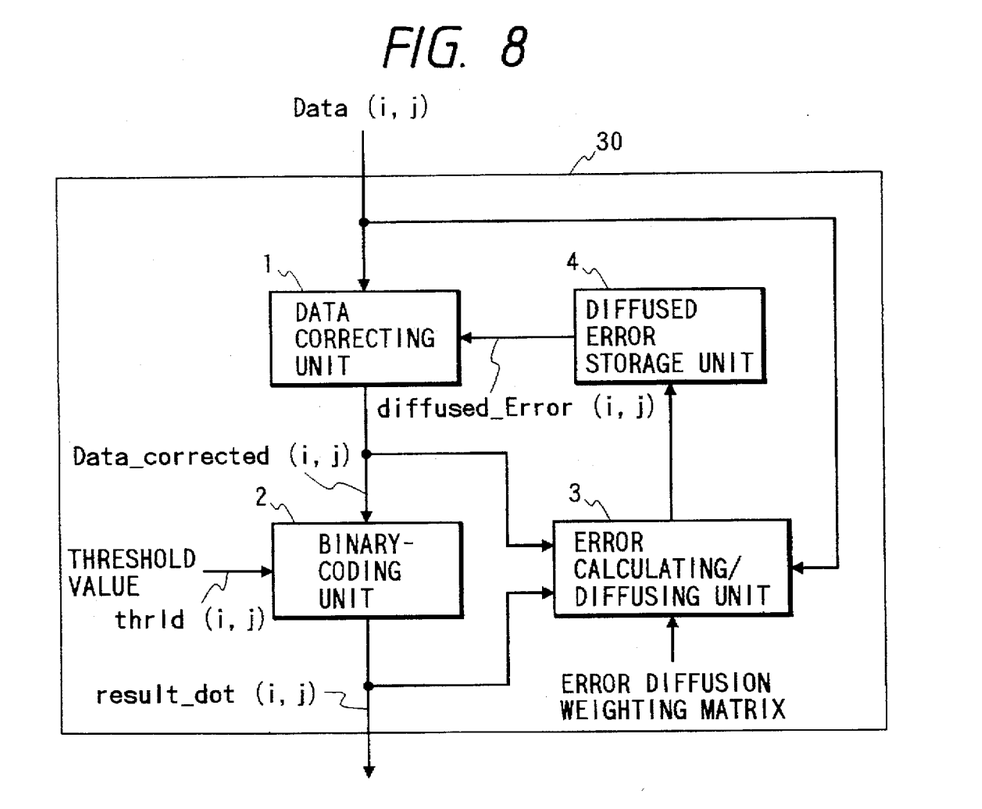
FIG. 8 is a block diagram for indicating a functional arrangement of the image processing apparatus according to the present invention.

As indicated in FIG. 8, the image processing apparatus 30 includes a data correcting unit 1, a binary-coding unit 2, an error calculating/diffusing unit 3, and a diffused error storage unit 4. The data correcting unit 1 sequentially directs the respective pixels present in an original image in a raster scanning order. In the following description, a directed pixel present at an i-th row and a j-th column is expressed by "P(i,j)". The data correcting unit 1 adds a diffused error "diffused_Error(i,j)" diffused from pixels to multi-gradation data "Data(i,j)" of the directed pixel P(i,j) to thereby calculate corrected data "Data_corrected(i,j)". These pixels are located near the directed pixel P(i,j) and have already been binary-code. In other words, the following calculation is carried out:

$$\text{Data\_corrected}(i,j) = \text{Data}(i,j) + \text{diffused\_Error}(i,j)$$

It should be noted that the multi-gradation data "Data(i,j)" corresponds to 256-gradation data having a range defined from a gradation value of "0" to a gradation value of "255".

The binary-coding unit 2 compares the corrected data "Data_corrected(i,j)" with a threshold value "thrld" to thereby binary-code the compared corrected data.

Concretely speaking, the following calculation is executed:

(1) If Data_corrected>thrld, result_dot(i,j)=dot ON (2) If Data_corrected≦thrld, result_dot(i,j)=dot OFF It should be understood that the threshold value "thrld" is usually fixed to "127" equal to a central value of the range defined from the gradation value of "0" to the gradation value of "255". Alternatively, this threshold value may be varied in accordance with the multi-gradation data "Data(i, j)" of the pixel of interest, or other factors (will be discussed later).

The error calculating/diffusing unit 3 calculates a quantizing error "Error (i,j)". Concretely speaking, the following calculation is carried out:

(1) If result_dot(i,j)=dot ON,
Error(i,j)=Data_corrected(i,j)−on_value(Data); and (2) If result_dot(i,j)=dot OFF,
Error(i,j)=Data_corrected(i,j).

Generally speaking, an evaluation value "on_value (Data)" is determined as follows: That is, when Data(i,j)= 255, the evaluation value "on_value(Data)"=255. Then, the smaller the multi-gradation data "Data(i,j)" becomes, the larger the evaluation value "on_value(Data)". Concretely speaking, for instance, as indicated as the straight line "A" of FIG. 2, the evaluation value is varied in accordance with the below-mentioned formula:

$$\text{on\_value}(Data) = 255 + (a-1) \times (255 - Data).$$

Otherwise, as represented as the curve "B" of FIG. 2, the evaluation value may be varied in accordance with the below-mentioned formula:

$$\text{on\_value}(Data) = 255 + (a-1) \times (255 - Data)(255 - Data)/255.$$

It should be noted that symbol "a" indicates a real number which is arbitrarily set and is greater than, or equal to 1. This symbol "a" implies such an evaluation that the contribution rate for the dot gradation in the low density region is "a" times higher than that for the high density region (will be referred as an "evaluation multiplier" hereinafter).

Figure 9:
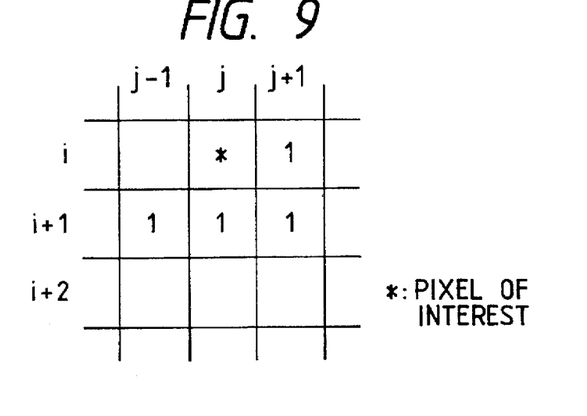
FIG. 9 is a diagram for showing an example of an error diffusion weighting matrix employed in the binary-coding process with using the error diffusion method.

When the quantizing error "Error(i,j)" is obtained in the above-described manner, the error calculating/diffusing unit 3 diffuses this quantizing error to a plurality of pixels which have not yet been binary-coded and are located near the pixel of interest in accordance with a preset error diffusion weighing matrix. For example, when the error diffusion weighing matrix is set as represented in FIG. 9, the errors "diffused_Error" which are diffused to the respective pixels (i, j+1), (i+1, j−1), (i+1,j), (i+1, j+1) are calculated respectively as follows:

diffused_Error(i,j+1)=diffused_Error(i,j+1)+Error(i, j)×¼;

diffused_Error(i+1,j−1)=diffused_Error(i+1,j−1)+Error (i,j)×¼;

diffused_Error(i+1,j)=diffused_Error(i+1,j)+Error(i, j)×¼; and diffused_Error(i+1,j+1)=diffused_Error(i+1,j+1)+Error (i,j)×¼.

The error diffusion in conjunction with the binary-coding process of the pixel of interest P(i,j) by the above-described adding process is accomplished.

The diffused error component is stored into a predetermined storage area of the diffused error storage unit 4 every pixel. When the binary-coding process related to the pixel of interest P(i,j) is accomplished, in the above manner, the value of "j" is incremented by 1, so that another pixel located neighbor this pixel of interest P(i,j) at a right side is set as a pixel of interest. Then, the binary-coding process and the error diffusion process are repeatedly performed to this new pixel of interest in a similar manner. When the binary-coding process operation of the input image data for 1 row is accomplished, the value of "j" is returned to zero at next time, and the value of "i" is incremented by 1. Thus, the pixel of interest is advanced to a pixel located at a left end of the next row, and a similar binary-coding process is repeated. Then, the binary-coding process of the input image data for 1 screen is carried out by performing this repeating process.

According to this embodiment, as previously described, the evaluation value "on_value(Data)" in case of the dot ON is determined in the calculation of the quantizing error in such a way that the smaller the gradation value "Data" of the multi-gradation image data becomes, the larger the evaluation value "on_value(Data)" becomes. As a consequence, the quantizing error in the error diffusion method can be controlled so as to become the optimum value, depending on the gradient value of the input image data, in various density regions whose ink density is different from each other, such as the low density region where the respective ink dots are independently present, and the high density region where the adjoining ink dots are located very close to the neighbor ink dot, or are superimposed with each other. For example, the smaller the gradation value becomes, the larger the quantizing error when the dot ON becomes, so that another dot ON can be hardly produced. As a result, very fine changes in gradation can be obtained, namely the smooth and continuous gradation characteristic can be obtained. Even when the gamma correction is carried out before the error diffusion process, since the gradation characteristic of the low density region becomes smooth and continuous, it is possible to prevent the quasi-contour from being produced. Moreover, the changing operation of the evaluation in the error diffusion method can be realized by employing a relatively simple arrangement, and the processing speed thereof can become high.

In the above-described embodiment, the evaluation value "on_value(Data)" during the dot ON is varied along either the straight line A or the curve B shown in FIG. 2. Instead, this evaluation value "on_value(Data)" may be varied along a correction curve (y=g(Data)) used to correct the gamma characteristic curve (Y=f(Data) of FIG. 1). If the variation mode of the evaluation value is set in this manner, then the gamma correction is necessarily executed when the binary-coding process by the error diffusion method is performed. Accordingly, the conventionally executed gamma correction may be omitted.

Figure 10:
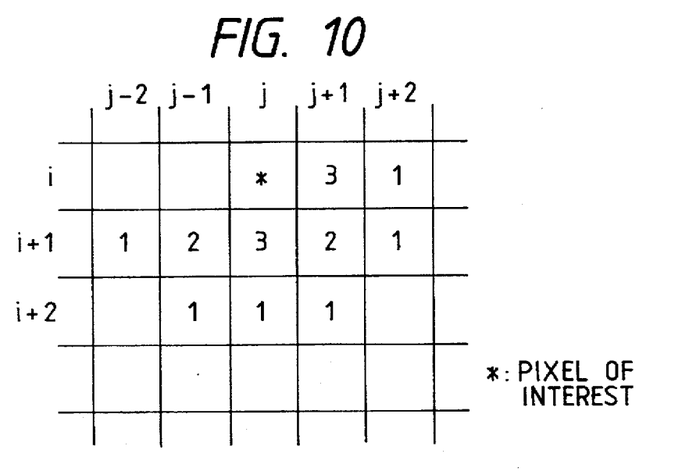
FIG. 10 is a diagram for indicating another example of an error diffusion weighting matrix employed in the binary-coding process with using the error diffusion method.

Also, in the above-described embodiment, as the error diffusion weighting matrix used in the error diffusion process, such a matrix that a total weighting value is equal to 4 (see FIG. 9) is utilized. Alternatively, when another matrix shown in FIG. 10 is employed, a matrix that a total weighting value is equal to 16 is utilized. In this case, the quantizing error "Error(i,j)" of the pixel of interest is diffused to ten pixels (i,j+1), (i,j+2), (i+1,j−2), (i+1,j−1), (i+1, j), (i+1,j+1), (i+1,j+2), (i+2,j−1), (i+2,j), and (i+2,j+1), which are located near this pixel of interest and have not yet been binary-coded. The diffusion errors to these ten pixels are defined as follows:

diffused_Error (i,j+1)
 = diffused_Error(i,j+1)+Error(i,j)×3/16;
diffused_Error(i+1,j)
 =diffused_Error(i+1,j)+Error(i,j)×3/16;
diffused_Error(i+1,j−1)
 =diffused_Error(i+1,j−1)+Error(i,j)×3/16;
diffused_Error(i+1,j+1)
 =diffused_Error (i+1,j+1)+Error(i,j)×3/16;
diffused_Error (i,j+2)
 =diffused_Error(i,j+2)+Error(i,j)×1/16;
diffused_Error(i+1,j−2)
 =diffused_Error(i+1,j−2)+Error(i,j)×1/16;
diffused_Error(i+1,j+2)

-continued

=diffused_Error(i+1,j+2)+Error(i,j)×1/16;
diffused_Error(i+2,j−1)
 =diffused_Error(i+2,j−1)+Error(i,j)×1/16;
diffused_Error(i+2,j)
 =diffused_Error(i+2,j)+Error(i,j)×1/16; and
diffused_Error(i+2,j+1)
 =diffused_Error(i+2,j+1)+Error(i,j)×1/16.

Next, a second embodiment of present invention will be described. This second embodiment is established by that the threshold value control technique in the error diffusion method as described in Japanese Laid-open Patent Application No. 7-111591 is applied to the principle idea of the present invention.

First of all, the technique of Japanese Laid-open Patent Application No. 7-111591 is simply explained. In the above-described embodiment mode, the fixed value is utilized as the threshold value in the error diffusion method. For example, the fixed threshold value is selected to be "127" with respect to the 256-gradation data. In the error diffusion method with using such a foxed threshold value, the image quality deterioration phenomenon called as "delay of dot occurrence" or "tailing phenomenon" will occur at a place near the location such as the boundary between the low density region and the high density region, where the gradation is rapidly changed in a step manner. This image deterioration phenomenon will now be simply explained more in detail with reference to FIG. 11 to FIG. 13.

Figure 11:
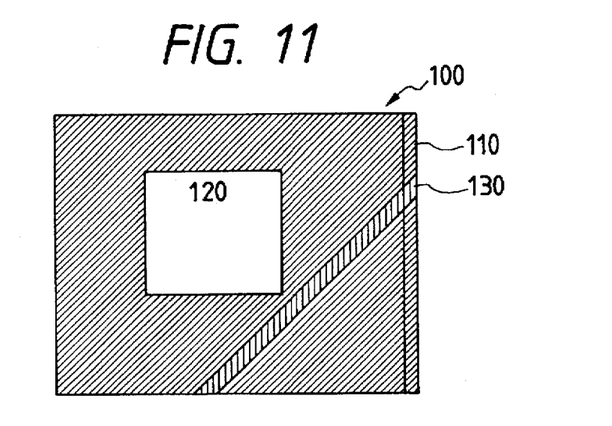
FIG. 11 is an explanatory diagram for showing one example of a 256-gradation image where a "trailing" phenomenon will easily occur.
Figure 12:
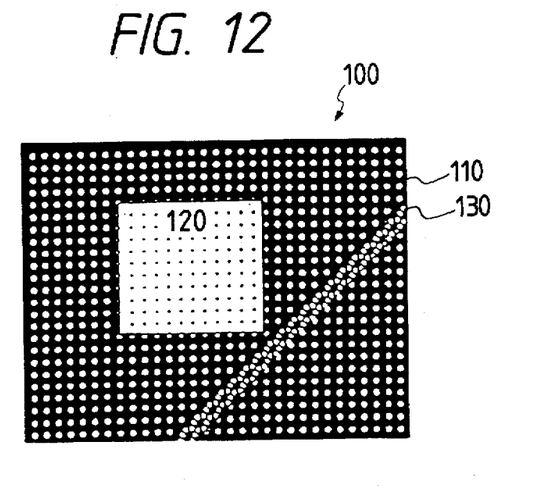
FIG. 12 is an explanatory diagram for indicating a binary-coded result of the image of FIG. 11 by using the ideal binary-coding method.

FIG. 11 represents one example of a 256-gradation image 100 where this image deterioration phenomenon will easily occur. In this image 100, a low density region 120 having a gradation value of 3 is present in a high density region 110 having a gradation value of 252, and also an inclined line 130 having a gradation value of 231 (relatively lower density than that of high density region 110) is present in the high density region 110. FIG. 12 represents a two-gradation image which is produced by binary-coding the gradation image 100 by employing the ideal method. On the other hand, FIG. 13 indicates such a binary-coded result obtained by binary-coding the gradation image 100 of FIG. 11 by way of the error diffusion method with employment of the fixed threshold value.

Figure 13:
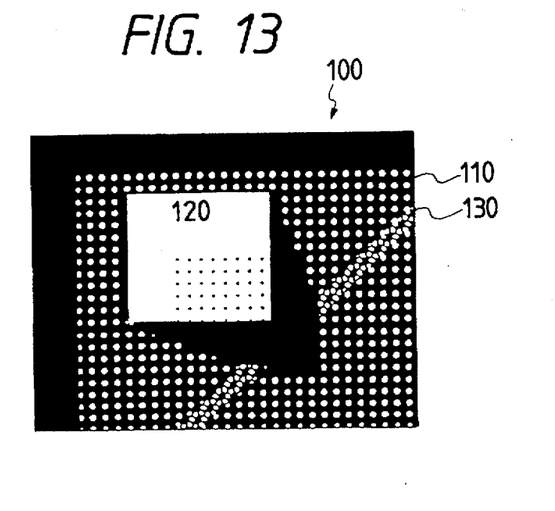
FIG. 13 is an explanatory diagram for indicating a binary-coded result of the image of FIG. 11 by using the fixed threshold value.

As easily understood from the comparison with the ideal image of FIG. 12, in the image shown in FIG. 13, the occurrence of dot OFF is delayed at the portions near the upper edge and the left edge within the high density region 110, and the occurrence of dot ON is delayed at the portions near the upper edge and the left edge within the low density region 120. Moreover, the occurrence of dot OFF is delayed at the lower right portion of the low density region 120 within the high density region 110, so that a portion 132 of a straight line 130 disappears.

The reason of this image quality deterioration phenomenon is explained in detail in Japanese Laid-open Patent Application No. 7-111591. In summary, a large amount of quantizing errors which have been stored in the previous low density region, or the previous high density region are diffused to the succeeding region having the different density from that of the previous low, or high density region. As a result of this diffusion, the binary-coded result obtained in this succeeding region having the different density will be distorted due to a large amount of errors occurred in the previous region.

To solve this problem, Japanese Laid-open Patent Application No. 7-111591 has proposed that the threshold value of the error diffusion method is varied in accordance with the value of the multi-gradation image data which is compared with this threshold value. That is, assuming now that the threshold value is "thrld", the gradation value of the multi-gradation image data to be compared with this threshold value is "Data", and the intermediate value for the dot ON gradation value of the two-gradation image data and the dot OFF gradation value thereof (namely, "0" and "255" in 256-gradation data) is "m", the threshold value "thrld" is varied in order to satisfy at least one of the following two conditions (1) and (2), namely:

(1) when "Data" is a gradation value of low density (namely, near "0"), Data≦thrld≦(m+Data)/2;

(2) when "Data" is a gradation value of high density (namely, near "255"), (m+Data)/2≦thrld≦Data.

According to this embodiment, a technique for adjusting this threshold value "thrld" is combined with the above-described embodiment mode. In this technique, the value "m" contained in the above-described threshold value adjusting conditions is defined as the intermediate value between the evaluation value during the dot OFF "off_value (Data)" and the evaluation value during the dot ON "on_value(Data)". That is:

$$m=(\text{off\_value}(Data)+\text{on\_value}(Data))/2$$

Normally, in this case, since "off_value(Data)" is equal to "0", the intermediate value "m" is given as follows:

$$m=\text{on\_value}(Data)/2.$$

Also, as previously explained, "on_value(Data)" is varied in accordance with the multi-gradation data "Data". For example, this evaluation value "on_value(Data)" is varied in accordance with such a linear equation:

$$\text{on\_value}(Data)=255+(a-1)\times(255-Data),$$

otherwise such a quadratic equation:

$$\text{on\_value}(Data)=255+(a-1)\times(255-Data)(255-Data)/255.$$

Figure 14:
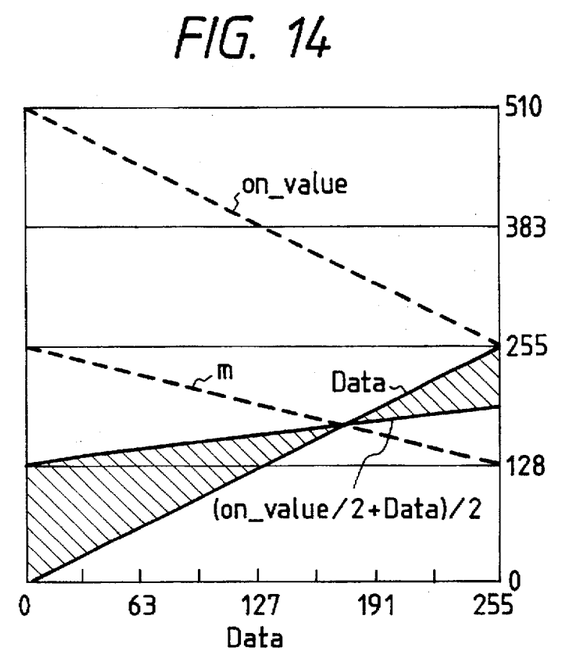
FIG. 14 is a graphic representation for showing an example of a selection range between "on_value(Data)" and "thrld" according to a second embodiment.
Figure 15:
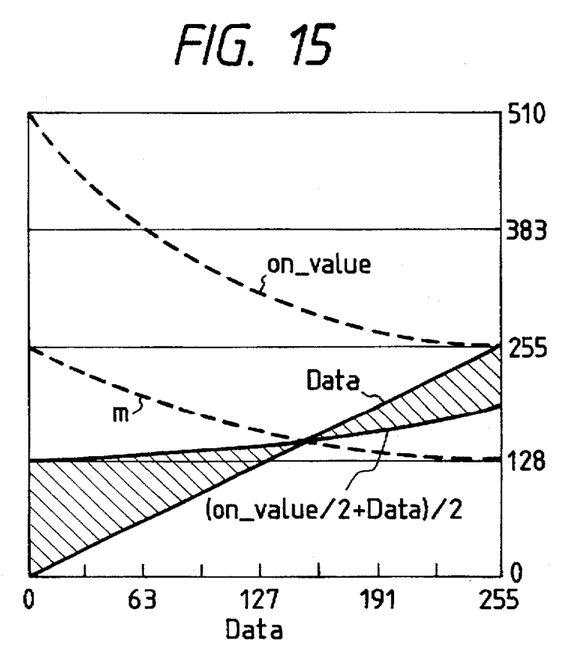
FIG. 15 is a graphic representation for showing an another example of a selection range between "on_value(Data)" and "thrld" according to a second embodiment.
Figure 16:
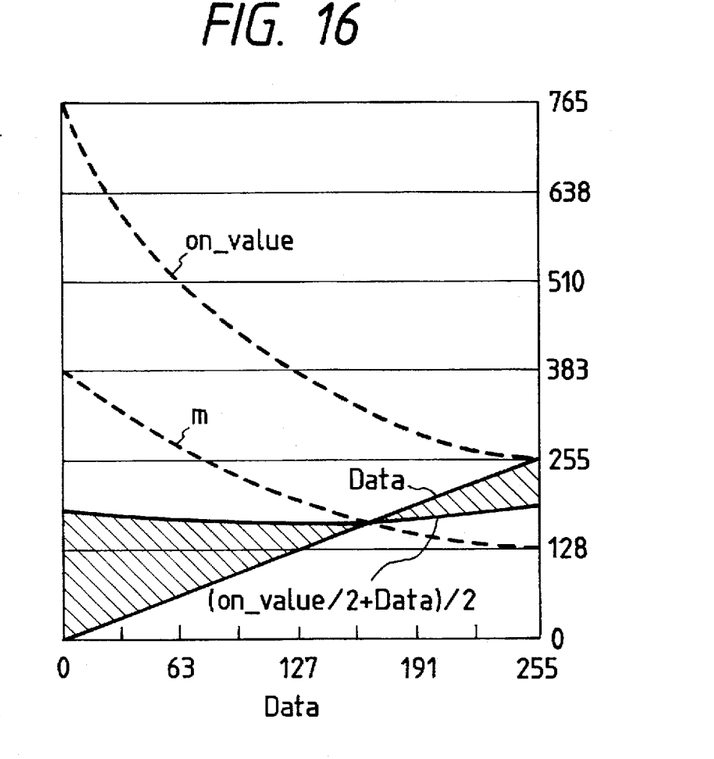
FIG. 16 is a graphic representation for showing a further example of a selection range between "on_value(Data)" and "thrld" according to a second embodiment.

FIG. 14 represents a selection range of the threshold value "thrld" in the case that the evaluation value "on_value (Data)" is varied by using the above-described linear equation. In this equation, the evaluation multiplier "a" is set to "2". FIG. 15 and FIG. 16 show selection ranges of the threshold value "thrld" in the case that the evaluation value "on_value(Data)" is varied by employing the above-described quadratic equation. It should be noted that the evaluation multiplier "a" is set to "2" in FIG. 15, and to "3" in FIG. 16.

In FIG. 14 to FIG. 16, a longer dotted line indicates "on_value(Data)", whereas a shorter dotted line denotes "m=on_value(Data)/2". two solid lines represent "Data" and "(m+Data)/2", respectively. A hatched region located between these two solid lines corresponds to a desirable selection range for the threshold value "thrld".

There are various variations in order to select concrete values of the threshold value "thrld". That is, the threshold value "thrld" may be selected from the hatched region over the entire range of "Data", or selected from the hatched region as to only a partial range. In the latter selection case, when "Data" is present near "0", or "255", it is desirable to select the threshold value "thrld" from the hatched region. In particular, when "Data" is located near "0", this threshold value should be selected from the hatched region. When "Data" is equal to an intermediate value, even if such a fixed threshold value "thrld" as "127" used in the prior art method is employed, the "tailing phenomenon" problem will not essentially occur.

Figure 17:
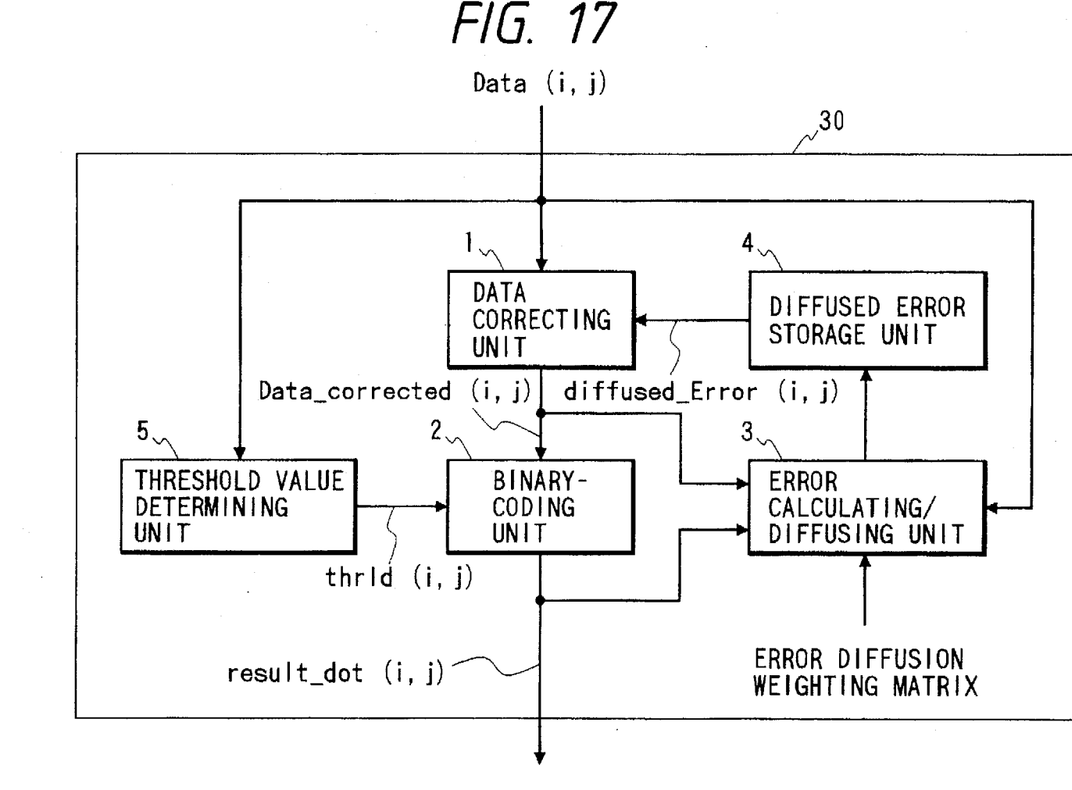
FIG. 17 is a block diagram for indicating an arrangement of an image processing apparatus according to the second embodiment.

FIG. 17 represents an arrangement of the image processing apparatus 30 according to this embodiment mode.

The arrangement of FIG. 17 is realized by adding a threshold value determining unit 5 to the arrangement shown in FIG. 8. The threshold value determining unit 5 selects a binary-coded threshold value "thrld(i,j)" with respect to a pixel of interest P(i,j) in response to multi-gradation data "Data(i,j)" of this pixel of interest P(i,j) in the above-described manner, and then transfers the selected binary-coded threshold value to the binary-coding unit 2. As the method for selecting the binary-coded threshold value "thrld (i,j)", there is such a method that, for example, a lookup table for registering values of "thrld" corresponding to various values of "Data" is previously stored in a memory, and then, "thrld(i,j)" corresponding to input data "Data(i,j)" is read out from this lookup table.

On the other hand, it should be noted that the principle idea of the present invention is not limited to the above-described typical error diffusion method, but may be similarly applied to the means error minimizing method corresponding to the modified error diffusion method. As previously explained, in accordance with the typical error diffusion method, after the pixel of interest is binary-coded, the quantizing error produced by this binary coding operation is diffused and added to the pixels which are located near this pixel of interest and have not yet been binary-coded. On the other, in the mean error minimizing method, data on a pixel of interest is corrected by employing a weighted mean value of a quantizing error occurred in pixels which are located near this pixel of interest and have been binary-coded before the pixel of interest is binary-coded. The comparing operation between the corrected data on the pixel of interest and the threshold value, and also the calculation about the quantizing error by employing the evaluation value are similarly executed in the typical error diffusion method and the mean error minimizing method. Essentially speaking, both methods are same methods.

In accordance with the basic idea of the present invention, similar to the above-explained embodiment mode, the evaluation value "on_value" during the dot ON, and the threshold value "thrld" are varied in accordance with "Data" even in the image processing apparatus with employment of the mean error minimizing method. As a result, it is possible to obtain such a binary-coded image without having the "delay of dot occurrence" and "tailing" phenomena, and also having the smooth gradation characteristic of the low density region.

It should be understood that any of the above-explained embodiment modes may be realized by way of the exclusively designed hardware, and also the exclusively programmed computer. In the exclusively programmed computer, this computer program may be supplied to the computer by way of such a medium capable of fixedly holding the program, for example, a semiconductor memory, and a disk storage device. Alternatively, this computer program may be furnished to the computer by way of another medium for holding the program in a fluid manner such as a communication network. As a conclusion, if the program constructed by any readable/understandable formats by the computer is supplied to this computer, then any types of media may be employed.

While the preferred embodiments according to the present invention have been described, the present invention is not limited to these preferred embodiments, but may be modified, improved, and substituted without departing from the technical scope of the present invention.

What is claimed is:

1. An image processing method for converting multi-gradation image data into two-gradation image data by employing an error diffusion method, the image processing method comprising the steps of:

(1) adding a diffusion error derived from at least one pixel which has already been binary-coded and is located near a pixel of interest to multi-gradation image data of this pixel of interest to thereby obtain corrected data;

(2) comparing the corrected data with a threshold value and converting the corrected data into two-gradation image data for indicating any one of a dot ON and a dot OFF;

(3) calculating a quantizing error corresponding to a difference between the corrected data and a first evaluation value corresponding to the two-gradation image data;

(4) diffusing the quantizing error to a plurality of pixels which have not yet been binary-coded and are located near the pixel of interest; and (5) varying the first evaluation value corresponding to the two-gradation image data indicative of the dot ON in accordance with the multi-gradation image data of the pixel of interest.

2. An image processing method as claimed in claim 1 wherein:

when the multi-gradation image data of the pixel of interest represents low density, the first evaluation value is such a value indicative of density higher than maximum density represented by the multi-gradation image data.

3. An image processing method as claimed in claim 1 wherein:

the lower the density indicated by the multi-gradation image data of the pixel of interest becomes, the greater the first evaluation value becomes.

4. An image processing method as claimed in claim 1 wherein:

the first evaluation value is changed in response to a gamma characteristic owned by an image forming apparatus for forming an image by accepting the two-gradation image data.

5. An image processing method as claimed in claim 4 wherein:

when a value of the multi-gradation image data of the pixel of interest is expressed as "Data", a gamma correction function equal to an inverse function of a gamma characteristic function of the image forming apparatus is expressed as "g(Data)", and the first evaluation value is expressed as "on_value(Data)", $$on\_value(Data)=A\times(Data/g(Data)),$$

where symbol "A" is a gradation value of maximum density achieved by the multi-gradation image data.

6. An image processing method as claimed in claim 1, further comprising the step of:

(6) changing the threshold value in response to the multi-gradation image data of the pixel of interest.

7. An image processing method as claimed in claim 6 wherein:

when the threshold value is expressed by "thrld", a value of the multi-gradation image data of the pixel of interest is expressed by "Data", the first evaluation value is expressed by "on_value (Data)", and a second evaluation value corresponding to the second gradation data indicative of the dot OFF is expressed by "off_value(Data)", the threshold value "thrld" is varied in order to satisfy at least one of the following two conditions (a) and (b), namely:

(a) when "Data" is a gradation value of low density, Data≦thrld≦(m+Data)/2;

(b) when "Data" is a gradation value of high density, (m+Data)/2≦thrld≦Data, where:

m=/2.

8. An image processing apparatus for converting multi-gradation data into two-gradation image data by employing an error diffusion method, comprising:

a data correcting unit for adding a diffusion error derived from at least one pixel which has already been binary-coded and is located near a pixel of interest to multi-gradation image data of this pixel of interest to thereby obtain corrected data;

a binary coding unit for comparing the corrected data with a threshold value and converting this compared data into two-gradation image data for indicating any one of a dot ON and a dot OFF; and an error calculating/diffusing unit for calculating a quantizing error corresponding to a difference between the corrected data and a first evaluation value corresponding to this two-gradation image data, and for diffusing the quantizing error to a plurality of pixels which have not yet been binary-coded and are located near the pixel of interest, wherein the error calculating/diffusing unit varies the first evaluation value corresponding to the two-gradation image data indicative of the dot ON in accordance with the multi-gradation image data of the pixel of interest.

9. An image processing apparatus as claimed in claim 8 wherein:

when the multi-gradation image data of the pixel of interest represents low density, the error calculating/diffusing unit sets the first evaluation value to such a value indicative of density higher than maximum density represented by the multi-gradation image data.

10. An image processing apparatus as claimed in claim 8 wherein:

the error calculating/diffusing unit sets the first evaluation value in such a manner that the lower the density indicated by the multi-gradation image data of the pixel of interest becomes, the greater the first evaluation value becomes.

11. An image processing apparatus as claimed in claim 8 wherein:

the error calculating/diffusing unit changes the first evaluation value in response to a gamma characteristic owned by an image forming apparatus for forming an image by accepting the two-gradation image data.

12. An image processing apparatus as claimed in claim 8, further comprising:

a threshold value determining unit for determining the threshold value in such a manner that the threshold value is changed in response to the multi-gradation image data of the pixel of interest.

13. An image processing apparatus as claimed in claim 12 wherein:

when the threshold value is expressed by "thrld", a value of the multi-gradation image data of the pixel of interest is expressed by "Data", the first evaluation value is expressed by "on_value (Data)", and a second evaluation value corresponding to the second gradation data indicative of the dot OFF is expressed by "off_value (Data)", the threshold value determining unit changes the threshold value "thrld" in order to satisfy at least one of the following two conditions (a) and (b), namely:

(a) when "Data" is a gradation value of low density, Data≦thrld≦(m+Data)/2;

(b) when "Data" is a gradation value of high density, (m+Data)/2≦thrld≦Data, where:

m=(off_value(Data)+on_value(Data))/2.

14. A program medium for supplying a computer program to a computer, the computer program being used to execute an image processing method for converting multi-gradation image data into two-gradation image data by employing an error diffusing method by a computer, wherein:

the computer holds such a program in a readable/ understandable form, which causes the computer to execute the steps of:

(1) adding a diffusion error derived from at least one pixel which has already been binary-coded and is located near a pixel of interest to multi-gradation image data of this pixel of interest to thereby obtain corrected data;

(2) comparing the corrected data with a threshold value and converting this compared data into two-gradation image data for indicating any one of a dot ON and a dot OFF;

(3) calculating a quantizing error corresponding to a difference between the corrected data and a first evaluation value corresponding to this two-gradation image data;

(4) diffusing the quantizing error to a plurality of pixels which have not yet been binary-coded and are located near the pixel of interest; and (5) varying the first evaluation value corresponding to the two-gradation image data indicative of the dot ON in accordance with the multi-gradation image data of the pixel of interest.

15. A program medium as claimed in claim 14, further comprising:

a program used to cause the computer to execute:

(6) a step for changing the threshold value in response to the multi-gradation image data of the pixel of interest.

* * * * *